US008896282B2

(12) United States Patent
Hasegawa et al.

(10) Patent No.: US 8,896,282 B2
(45) Date of Patent: Nov. 25, 2014

(54) CONVERTER CONTROLLER

(75) Inventors: Takahiko Hasegawa, Toyota (JP); Nobuyuki Kitamura, Minamitsuru-gun (JP); Kota Manabe, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 85 days.

(21) Appl. No.: 13/383,119

(22) PCT Filed: Jul. 10, 2009

(86) PCT No.: PCT/JP2009/062594
§ 371 (c)(1),
(2), (4) Date: Jan. 9, 2012

(87) PCT Pub. No.: WO2011/004492
PCT Pub. Date: Jan. 13, 2011

(65) Prior Publication Data
US 2012/0139522 A1    Jun. 7, 2012

(51) Int. Cl.
H02M 3/156 (2006.01)
H02M 3/158 (2006.01)
H02M 1/32 (2007.01)
B60L 11/18 (2006.01)
H02M 1/34 (2007.01)
H02M 1/00 (2006.01)

(52) U.S. Cl.
CPC .... H02M 3/1584 (2013.01); H02M 2001/0058 (2013.01); H02M 1/32 (2013.01); B60L 11/1887 (2013.01); H02M 1/34 (2013.01); Y02T 90/34 (2013.01); B60L 11/1892 (2013.01)
USPC .......................................... 323/284; 323/225

(58) Field of Classification Search
USPC ........ 363/49, 59, 16; 323/271, 282, 351, 272, 323/321, 238, 222, 259, 225, 284
See application file for complete search history.

(56) References Cited

U.S. PATENT DOCUMENTS 4,155,112 A * 5/1979 Miller et al. ................... 323/222
5,754,384 A * 5/1998 Ashley .......................... 361/93.9
(Continued)

FOREIGN PATENT DOCUMENTS

CA        2710505 A1      7/2009
DE    112009004843 T5     9/2012
(Continued)

OTHER PUBLICATIONS

International Search Report mailed Oct. 13, 2009 of PCT/JP2009/062594.
(Continued)

Primary Examiner — Gary L Laxton
Assistant Examiner — Trinh Dang
(74) Attorney, Agent, or Firm — Kenyon & Kenyon LLP

(57) ABSTRACT

There is disclosed a converter controller which can simply and early detect an abnormality of an auxiliary circuit constituting a soft switching converter. On turning off a first switching element, a controller detects a voltage between both the ends of a snubber capacitor and a voltage between both the ends of the first switching element, to obtain a difference voltage. The controller compares the obtained difference voltage with a voltage threshold value stored in a memory (not shown) to judge whether or not the difference voltage is larger than the voltage threshold value. When the difference voltage is smaller than the voltage threshold value, the controller judges that an auxiliary circuit is normal, to end processing, whereas when the difference voltage is not less than the voltage threshold value, the controller judges that a failure (an open failure) occurs in the auxiliary circuit, to shift to a fail safe operation, thereby ending the processing.

8 Claims, 18 Drawing Sheets

(56) References Cited

U.S. PATENT DOCUMENTS

| | | | |
|---|---|---|---|
| 2006/0262577 A1* | 11/2006 | Schenk | 363/50 |
| 2007/0216390 A1* | 9/2007 | Wai et al. | 323/351 |
| 2012/0074919 A1 | 3/2012 | Hasegawa et al. | |

FOREIGN PATENT DOCUMENTS

| | | |
|---|---|---|
| JP | 7-135013 A | 5/1995 |
| JP | 8-021861 A | 1/1996 |
| JP | 10-94249 | 4/1998 |
| JP | 2000-036308 A | 2/2000 |
| JP | 2002-198792 A | 7/2002 |
| JP | 2006-042443 A | 2/2006 |
| JP | 2006-340476 A | 12/2006 |
| JP | 2007-006669 A | 1/2007 |
| JP | 2005-102438 A | 5/2007 |
| JP | 2008-079447 A | 4/2008 |
| JP | 2009-124880 A | 6/2009 |
| WO | 2006/098376 A1 | 9/2006 |

OTHER PUBLICATIONS

Patent Abstracts of Japan, English-language abstract of JP 2006-340476.

Patent Abstracts of Japan, English-language abstract of JP 10-094249.

\* cited by examiner

CONVERTER CONTROLLER

This is a 371 national phase application of PCT/JP2009/062594 filed 10 Jul. 2009, the contents of which are incorporated herein by reference.

TECHNICAL FIELD

The present invention relates to a converter controller which controls an output voltage of a fuel cell.

BACKGROUND ART

For coping with a rapid load change and the like in excess of a power generation ability of a fuel cell in a fuel cell system mounted on a car and the like, there have been suggested various hybrid type fuel cell systems including a fuel cell and a battery as power sources.

In the hybrid type fuel cell systems, an output voltage of the fuel cell and an output voltage of the battery are controlled by a DC/DC converter. As the DC/DC converter which performs such control, there is widely utilized a type of converter which allows a switching element of a power transistor, IGBT, FET or the like to perform a PWM operation, thereby converting the voltage. It has been desirable that the DC/DC converter achieves lower loss, higher efficiency and lower noise with the power saving, miniaturization and performance improvement of an electronic apparatus. In particular, it has been desirable that switching loss and switching surge accompanying the PWM operation are decreased.

One of technologies for decreasing the switching loss and switching surge is a soft switching technology. Here, the soft switching is a switching system for realizing zero voltage switching (ZVS) or zero current switching (ZCS), and the switching loss of a power semiconductor device or stress given thereto is low. On the other hand, a switching system which directly turns on or off a voltage or a current by a switching function of the power semiconductor device is referred to as hard switching. In the following description, a system in which both or one of ZVS and ZCS is realized will be referred to as the soft switching, and another system will be referred to as the hard switching.

The soft switching is realized by a converter (the so-called soft switching converter) in which an auxiliary circuit for decreasing the switching loss is added to a usual step up/down type DC/DC converter including, for example, an inductor, a switching element and a diode (e.g. see Patent Document 1).

PRIOR ART DOCUMENTS

Patent Documents

[Patent Document 1] JP-A-2005-102438

SUMMARY OF THE INVENTION

Problems to be Solved by the Invention

When an abnormality occurs in an auxiliary circuit of such a soft switching converter, soft switching cannot be realized. Therefore, it has been necessary to simply and early detect such an abnormality of the auxiliary circuit.

The present invention has been developed in view of the above situation, and an object thereof is to provide a converter controller which can simply and early detect the abnormality of an auxiliary circuit constituting a soft switching converter.

Means for Solving the Problem

To solve the above problem, a converter controller according to the present invention is a controller of a soft switching converter which controls an output voltage of a fuel cell and which includes a main voltage raising circuit and an auxiliary circuit, the auxiliary circuit including: an auxiliary switch connected in parallel with a main switch constituting the main voltage raising circuit, and a first series connecting member in which a clamp diode and a snubber capacitor are connected in series, the clamp diode and the snubber capacitor being connected in parallel with the main switch and connected to a high potential side terminal and a low potential side terminal of the fuel cell, the converter controller comprising: detecting means for detecting a voltage between both the ends of the snubber capacitor clamped by the clamp diode in a case where the main switch is turned off; and judging means for comparing the voltage between both the ends of the snubber capacitor with a set normal voltage threshold value to judge that an abnormality occurs in the auxiliary circuit in a case where the voltage between both the ends exceeds the normal voltage threshold value.

According to such a constitution, in the case where the voltage between both the ends of the snubber capacitor exceeds the normal voltage threshold value, it is judged that the abnormality (an open failure or the like) occurs in the auxiliary circuit. Here, when a large surge voltage Vsu is generated in the main switch (see FIG. 14), a large energy loss occurs in the main switch. In the worst case, there is a possibility that abnormal overheat incurs breakdown of an element or brings about the dielectric breakdown of the element. However, according to the above constitution, it is possible to simply and early detect the abnormality of the auxiliary circuit. This enables rapid transition to a fail safe operation. In consequence, it is possible to prevent a problem such as the element breakdown in advance.

Here, in the above constitution, a preferable configuration further comprises a difference deriving means for obtaining a difference voltage between the voltage between both the ends of the snubber capacitor and a voltage between both the ends of the main switch, and the judging means compares the difference voltage with a set failure determination threshold value to judge that the abnormality occurs in the auxiliary circuit in a case where the difference voltage exceeds the failure determination value.

Moreover, in the above constitution, a preferable configuration further comprises fail safe means for stopping an operation of the main voltage raising circuit in a case where it is judged that the abnormality occurs in the auxiliary circuit.

Furthermore, in the above constitution, a preferable configuration further comprises fail safe means for limiting a rate of change of a current which flows through the main switch of the main voltage raising circuit to a threshold rate of change or less, in a case where it is judged that the abnormality occurs in the auxiliary circuit.

Additionally, the above constitution may have a configuration where the fail safe means sets a gate resistance in the case where it is judged that the abnormality occurs in the auxiliary circuit to a value which is larger than a gate resistance of the main switch in a case where it is judged that the auxiliary circuit is normal, to limit the rate of change of the current to the threshold rate of change or less.

Moreover, in the above constitution, there is also a preferable configuration where the fail safe means sets a maximum permissible value of a load in the case where it is judged that the abnormality occurs in the auxiliary circuit to a value which is smaller than a maximum permissible value of the load in the case where it is judged that the auxiliary circuit is normal, to limit the rate of change of the current to the threshold rate of change or less.

Furthermore, in the above constitution, there is a preferable configuration where the auxiliary circuit further includes a second series connecting member in which a diode, an auxiliary coil and the auxiliary switch are connected in series, the diode, the auxiliary coil and the auxiliary switch being connected to a portion between a connecting portion of the clamp diode and the snubber capacitor and one end of the main coil.

Additionally, in the above constitution, there is a preferable configuration where the main voltage raising circuit further includes a main coil whose one end is connected to the high potential side terminal of the fuel cell, a first diode whose cathode is connected to the other end of the main coil, and a smoothing capacitor connected to an anode of the first diode and the low potential side terminal of the fuel cell, and one end of the main switch is connected to the other end of the main coil and the other end thereof is connected to the low potential side terminal of the fuel cell.

Moreover, in the above constitution, there is a preferable configuration where the soft switching converter is a multiphase soft switching converter comprising the auxiliary circuit every phase, and auxiliary coils constituting the auxiliary circuits of the respective phases are common to the auxiliary circuits of all the phases.

Effect of the Invention

According to the present invention, it is possible to simply and early detect an abnormality of an auxiliary circuit constituting a soft switching converter.

MODE FOR CARRYING OUT THE INVENTION

A. Present Embodiment

Figure 1:
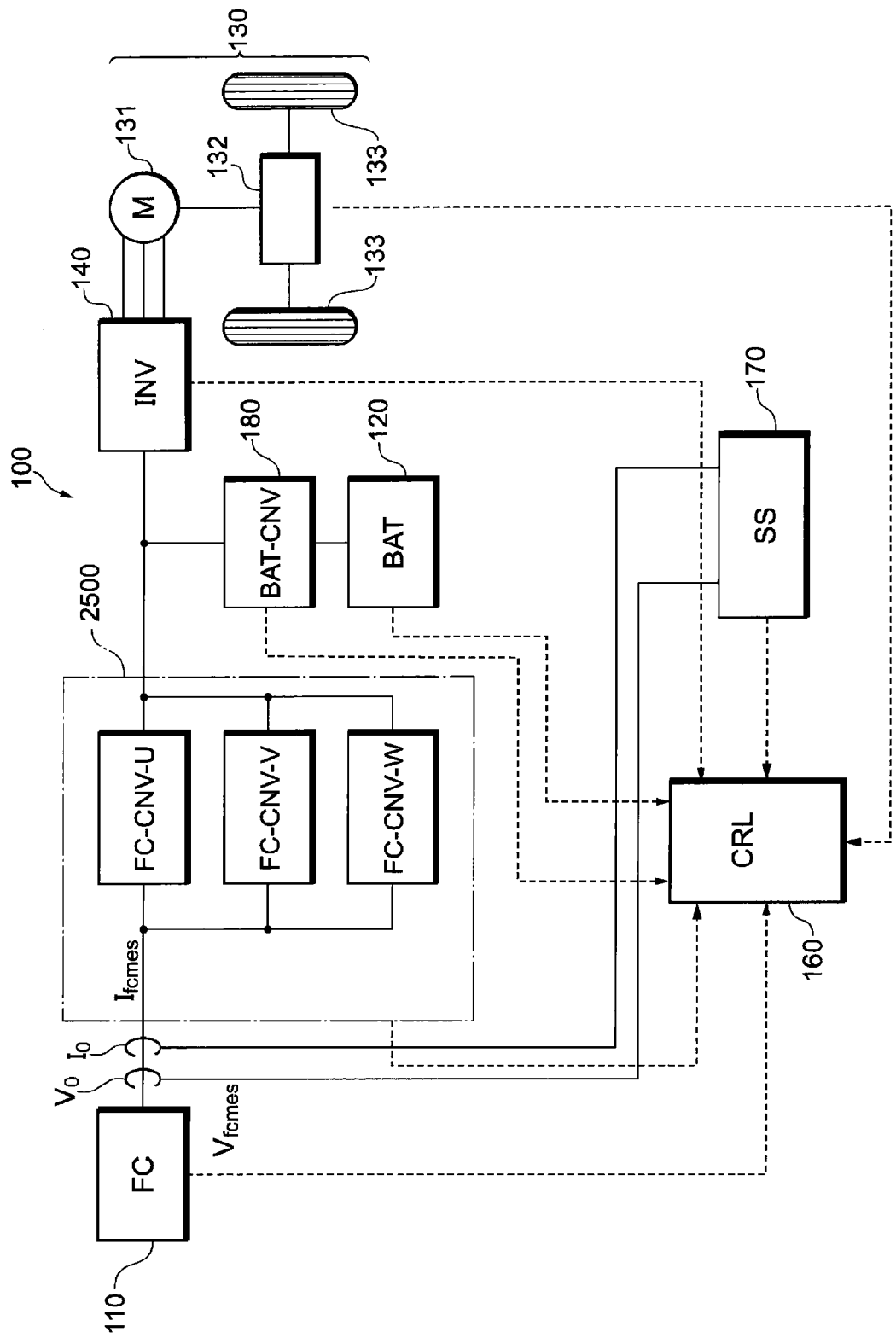
FIG. 1 is a system block diagram of an FCHV system according to the present embodiment.

Hereinafter, an embodiment according to the present invention will be described with reference to drawings. FIG. 1 shows a constitution of an FCHV system mounted on a vehicle according to the present embodiment. It is to be noted that in the following description, a fuel cell hybrid vehicle (FCHV) is assumed as an example of the vehicle, but the present invention can be applied to an electric car and the like. Moreover, the present invention can be applied not only to the vehicle but also to various mobile bodies (e.g. a ship, an airplane, a robot, etc.), a stationary power source, and a potable fuel cell system.

A-1. Whole Constitution of System

In an FCHV system 100, an FC converter 2500 is provided between a fuel cell 110 and an inverter 140, and a DC/DC converter (hereinafter referred to as the battery converter) 180 is provided between a battery 120 and the inverter 140.

The fuel cell 110 is a solid polymer electrolyte type cell stack obtained by stacking a plurality of unit cells in series. To the fuel cell 110, there are attached a voltage sensor V0 for detecting an output voltage Vfcmes of the fuel cell 110 and a current sensor I0 for detecting an output current Ifcmes. In the fuel cell 110, an oxidizing reaction of formula (1) occurs in an anode, a reductive reaction of formula (2) occurs in a cathode, and an electromotive reaction of formula (3) occurs in the whole fuel cell 110.

$$H_2 \rightarrow 2H^+ + 2e^- \tag{1}$$

$$(1/2)O_2 + 2H^+ + 2e^- \rightarrow H_2O \tag{2}$$

$$H_2 + (1/2)O_2 \rightarrow H_2O \tag{3}$$

Each unit cell has a structure where an MEA in which a polymer electrolytic film or the like is sandwiched between two electrodes of a fuel electrode and an air electrode is sandwiched between separators for supplying a fuel gas and an oxidizing gas. In the anode, a catalyst layer for the anode is provided on a porous support layer, and in the cathode, a catalyst layer for the cathode is provided on a porous support layer.

The fuel cell 110 is provided with a system which supplies the fuel gas to the anode, a system which supplies the oxidizing gas to the cathode and a system which provides a cooling liquid (any of the systems is not shown). When an amount of the fuel gas to be supplied and an amount of the oxidizing gas to be supplied are controlled in accordance with a control signal from a controller 160, a desirable power can be generated.

An FC converter 2500 assumes a role of controlling the output voltage Vfcmes of the fuel cell 110, and is a bidirectional voltage converter which converts the output voltage Vfcmes input on a primary side (an input side: a fuel cell 110 side) into a voltage value different from that of the primary side (raises or lowers the voltage) to output the value to a secondary side (an output side: an inverter 140 side). Conversely, the converter converts a voltage input on the secondary side into a voltage different from that of the secondary side to output the voltage to the primary side. The FC converter 2500 executes control so that the output voltage Vfcmes of the fuel cell 110 becomes a voltage which matches a desired output.

The battery 120 is connected in parallel with the fuel cell 110 with respect to a load 130, and functions as a storage source of a surplus power, a regenerative energy storage source at a regenerative braking time, and an energy buffer at a load variation time accompanying the acceleration or deceleration of the fuel cell vehicle. As the battery 120, for example, a nickel cadmium storage battery, a nickel hydrogen storage battery or a secondary battery such as a lithium secondary battery is utilized.

The battery converter 180 assumes a role of controlling the input voltage of the inverter 140, and has a circuit constitution similar to, for example, the FC converter 2500. It is to be noted that as the battery converter 180, a voltage raising type converter may be employed, but in place of this converter, a voltage raising/lowering type converter which enables a voltage raising operation and a voltage lowering operation may be employed. Any constitution that enables the control of the input voltage of the inverter 140 can be employed.

The inverter 140 is a PWM inverter to be driven by, for example, a pulse width modulation system. In accordance with a control command from the controller 160, the inverter converts a direct-current power output from the fuel cell 110 or the battery 120 into a three-phase alternate-current power, to control a running torque of a traction motor 131.

The traction motor 131 generates a main power of the present vehicle, and generates a regenerative power during deceleration. A differential 132 is a decelerator which decelerates high-speed rotation of the traction motor 131 to a predetermined rotation number, to rotate a shaft provided with tires 133. The shaft is provided with a wheel speed sensor or the like not shown, whereby a vehicle speed or the like of the vehicle is detected. It is to be noted that in the present embodiment, all apparatuses (including the traction motor 131 and the differential 132) that receive the power supplied from the fuel cell 110 to be operable are generically referred to as the load 130.

The controller 160 is a computer system for the control of the FCHV system 100, and includes, for example, a CPU, an RAM, an ROM, and the like. The controller 160 inputs various signals (e.g. a signal indicating an accelerator pedal open degree, a signal indicating the vehicle speed, a signal indicating the output current or output terminal voltage of the fuel cell 110, etc.) supplied from a sensor group 170, to obtain a required power of the load 130 (i.e. the required power of the whole system).

The required power of the load 130 is, for example, a total value of a vehicle running power and an auxiliary machine power. The auxiliary machine power includes a power to be consumed by car-mounted auxiliary machines (a humidifier, an air compressor, a hydrogen pump, a cooling water circulation pump, etc.), a power to be consumed by devices required for the vehicle running (a change gear, a vehicle wheel controller, a steering device, a suspension device, etc.), a power to be consumed by devices arranged in a passenger space (an air conditioner, a lighting fixture, an audio device, etc.), and the like.

Moreover, the controller (the converter controller) 160 determines a distribution of the output powers of the fuel cell 110 and the battery 120, to calculate a power generation command value. On calculating the required powers for the fuel cell 110 and the battery 120, the controller 160 controls the operations of the FC converter 2500 and the battery converter 180 so as to obtain these required powers.

A-2. Constitution of FC Converter

As shown in FIG. 1, the FC converter 2500 includes a circuit constitution as a three-phase resonance type converter constituted of a U-phase, a V-phase and a W-phase. In the circuit constitution of the three-phase resonance type converter, there are combined a circuit portion which is similar to the inverter to once convert the input direct-current voltage into an alternate current and a portion which rectifies the alternate current to convert the current into a different direct-current voltage again. In the present embodiment, as the FC converter 2500, a multiphase soft switching converter (hereinafter referred to as the multiphase FC soft switching converter) including a free wheel circuit (details will be described later) is employed.

A-2-1. Description of Multiphase FC Soft Switching Converter

Figure 2:
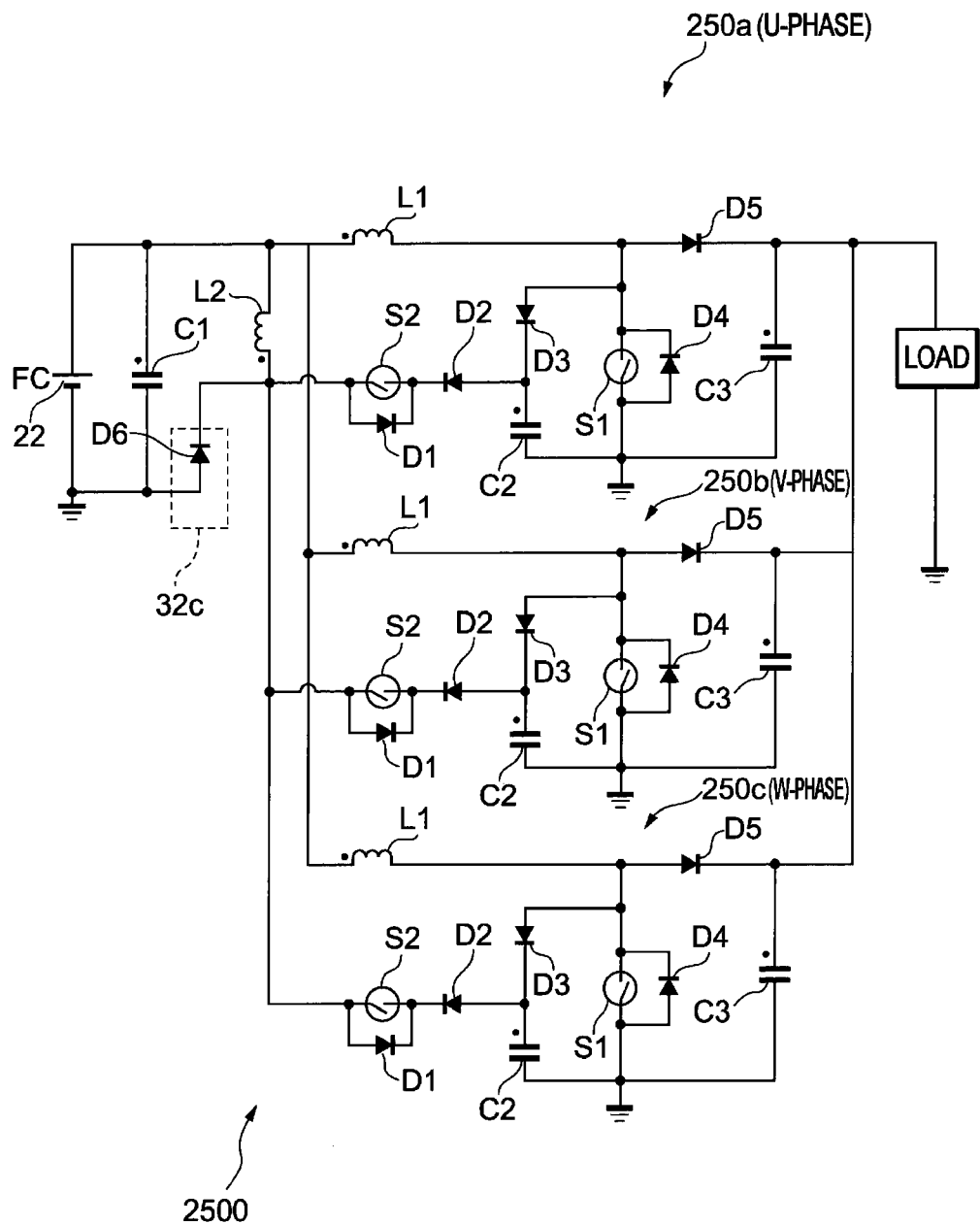
FIG. 2 is a diagram showing a circuit constitution of a multiphase FC soft switching converter according to the embodiment.
Figure 3:
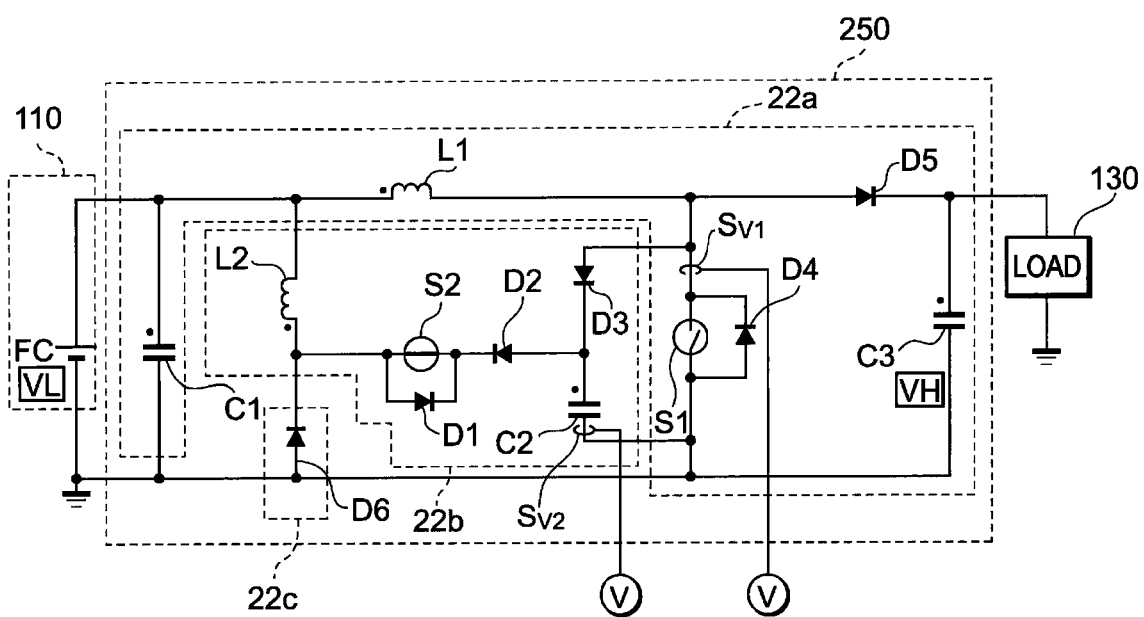
FIG. 3 is a diagram showing a circuit constitution for one phase of the FC soft switching converter according to the embodiment.

FIG. 2 is a diagram showing a circuit constitution of the multiphase FC soft switching converter 2500 mounted on the FCHV system 100, and FIG. 3 is a diagram showing a circuit constitution for one phase of the multiphase FC soft switching converter 2500.

In the following description, U-phase, V-phase and W-phase FC soft switching converters constituting the multiphase FC soft switching converter 2500 will be called FC soft switching converters 250a, 25b, and 250c, respectively. When the converters do not particularly have to be distinguished, the converters will simply be called an FC soft switching converter 250. Moreover, a voltage to be input into the FC soft switching converter 250 before raised is called a converter input voltage Vin, and the raised voltage output from the FC soft switching converter 250 is called a converter output voltage Vout.

As shown in FIG. 3, each FC soft switching converter 250 includes a main voltage raising circuit 22a for performing a voltage raising operation, an auxiliary circuit 22b for performing a soft switching operation, and a free wheel circuit 22c.

The main voltage raising circuit 22a releases energy accumulated in a coil L1 to the load 130 via a diode D5 by a switch operation of a switching circuit constituted of a first switching element S1 including an insulated gate bipolar transistor (IGBT) or the like and a diode D4, to raise the output voltage of the fuel cell 110.

Description will be made in detail. One end of the coil L1 is connected to a high potential side terminal of the fuel cell 110, a pole of one end of the first switching element S1 is connected to the other end of the coil L1, and a pole of the other end of the first switching element S1 is connected to a low potential side terminal of the fuel cell 110. Moreover, a cathode terminal of the diode D5 is connected to the other end of the coil L1. Furthermore, a capacitor C3 which functions as a smoothing capacitor is connected to a portion between an anode terminal of the diode D5 and the other end of the first switching element S1. The main voltage raising circuit 22a is provided with a smoothing capacitor C1 on the fuel cell 110 side, whereby it is possible to decrease ripples of the output current of the fuel cell 110. It is to be noted that there is provided a voltage sensor Sv1 which detects a voltage between both the ends of the first switching element S1.

Here, a voltage VH applied to the capacitor C3 becomes the converter output voltage Vout of the FC soft switching converter 150, and a voltage VL applied to the smoothing capacitor C1 is the output voltage of the fuel cell 110, and becomes the converter input voltage Vin of the FC soft switching converter 150.

The auxiliary circuit 22b includes a first series connecting member including a clamp diode D3 connected in parallel with the first switching element S1 and a snubber capacitor C2 connected in series with the clamp diode D3. In the first series connecting member, a cathode terminal of the clamp diode D3 is connected to the other end of the coil L1, and an anode terminal of the clamp diode D3 is connected to one end of the snubber capacitor C2. Furthermore, the other end of the snubber capacitor C2 is connected to the low potential side terminal of the fuel cell 110. It is to be noted that there is provided a voltage sensor Sv2 which detects a voltage between both the ends of the snubber capacitor C2.

Furthermore, the auxiliary circuit 22b includes a second series connecting member constituted of a diode D2, a second switching element S2, a diode D1, and an auxiliary coil L2 which is common to the respective phases.

In the second series connecting member, an anode terminal of the diode D2 is connected to a connecting portion between the clamp diode D3 and the snubber capacitor C2 of the first series connecting member. Furthermore, a cathode terminal of the diode D2 is connected to a pole of one end of the second switching element (the auxiliary switch) S2. Moreover, a pole of the other end of the second switching element S2 is connected to a connecting portion between the auxiliary coil L2 and the free wheel circuit 22c. An anode terminal of a free wheel diode D6 is connected to the low potential side of the fuel cell 110, whereas a cathode terminal of the free wheel diode D6 is connected to the auxiliary coil L2. The free wheel circuit 22c is a circuit including the free wheel diode D6 which is common to the respective phases, to realize a fail safe function provided to prevent the generation of such a surge voltage as to break down the second switching element S2 in advance even in a case where the second switching element S2 has an open failure or the like during the energization of the auxiliary coil L2. It is to be noted that the present invention can be applied also to a constitution which is not provided with the free wheel circuit 22c.

In the FC soft switching converter 250 having such a constitution, the controller 160 regulates a switching duty ratio of the first switching element S1 of each phase, whereby a voltage raising ratio of the FC soft switching converter 250, i.e., a ratio of the converter output voltage Vout with respect to the converter input voltage Vin is controlled. Moreover, when the switching operation of the second switching element S2 of the auxiliary circuit 12b is interposed in the switching operation of the first switching element S1, the soft switching is realized.

Figure 4:
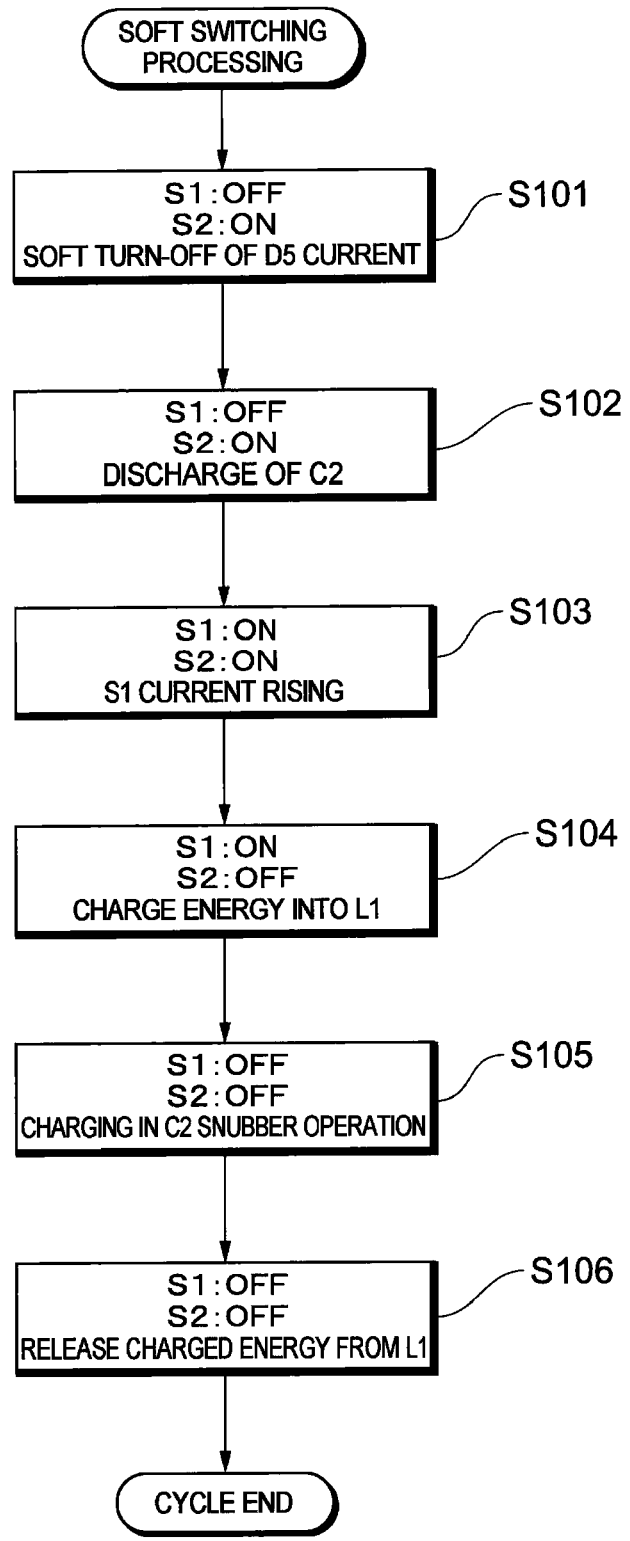
FIG. 4 is a flowchart showing soft switching processing according to the embodiment.

Next, a soft switching operation by the FC soft switching converter 250 will be described with reference to FIG. 4, and the like. FIG. 4 is a flowchart showing processing (hereinafter referred to as the soft switching processing) for one cycle of the FC soft switching converter 25 via the soft switching operation. The controller 160 successively executes steps S101 to S106 shown in FIG. 4, to form the cycle. It is to be noted that in the following description, modes indicating states of the current and voltage of the FC soft switching converter 25 are represented by mode 1 to mode 6, respectively, and the states are shown in FIG. 5 to FIG. 10. Moreover, FIG. 5 to FIG. 10 show currents flowing through circuits by arrows.

<Soft Switching Operation>

First, an initial state where the soft switching processing shown in FIG. 4 is performed is a state where the required power is supplied from the fuel cell 110 to the load 130, i.e., a state where both the first switching element S1 and the second switching element S2 are turned off to supply the current to the load 130 through the coil L1 and the diode D5. (Mode 1; see FIG. 5)

In the step S101, the turn-off of the first switching element S1 is held, whereas the second switching element S2 is turned on. When such a switching operation is performed, the current flowing on a load 130 side gradually moves to an auxiliary circuit 12b side through the coil L1, the diode D3, the second switching element S2 and the auxiliary coil L2 owing to a potential difference between the output voltage VH and the input voltage VL of the FC soft switching converter 150. It is to be noted that in FIG. 5, a behavior of the moving of the current from the load 130 side to the auxiliary circuit 12b side is shown by a white arrow.

Figure 5:
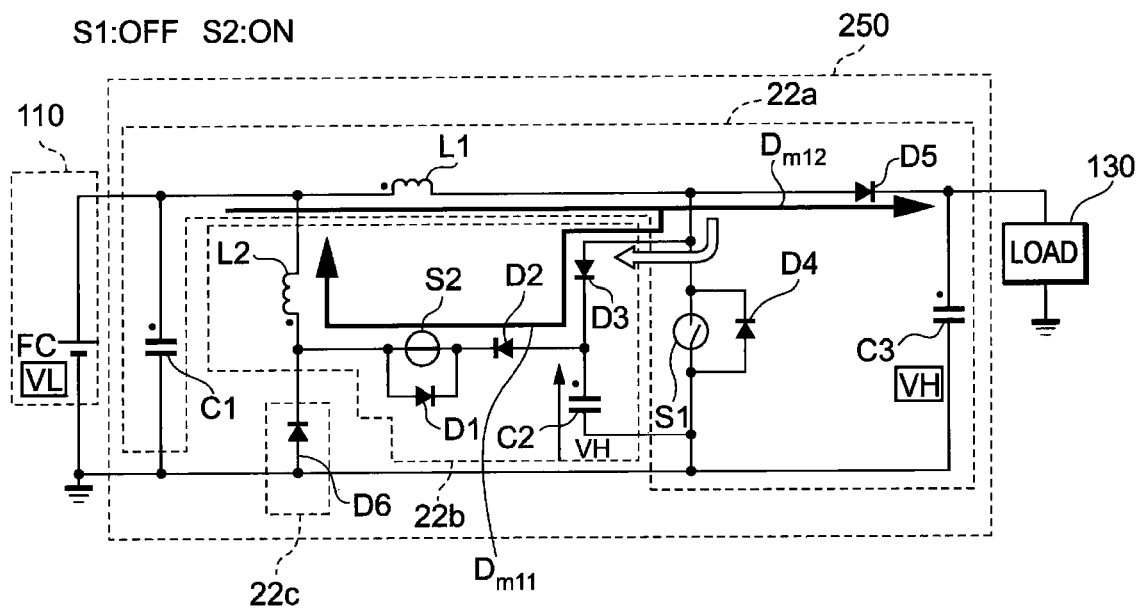
FIG. 5 is diagram showing an operation of mode 1.

Moreover, when the second switching element S2 is turned on, the circulation of the current occurs in a direction of an arrow Dm11 shown in FIG. 5. Here, a current change speed of the second switching element S2 increases in accordance with a voltage (VH−VL) between both the ends of the auxiliary coil L2 and an inductance of the auxiliary coil L2, but the current flowing through the second switching element S2 is suppressed by the auxiliary coil L2. Eventually, the soft turn-off of the current flowing on the load 130 side through the diode D5 (see an arrow Dm12 shown in FIG. 5) is realized.

Here, a transition completing time tmode1 from the mode 1 to the mode 2 is represented by the following equation (4).

$$tmode1 = \max\left(Ip - \frac{\Delta I}{2}, 0\right) \times \frac{L2id}{(VH - VL)} \quad (4)$$

Figure 6:
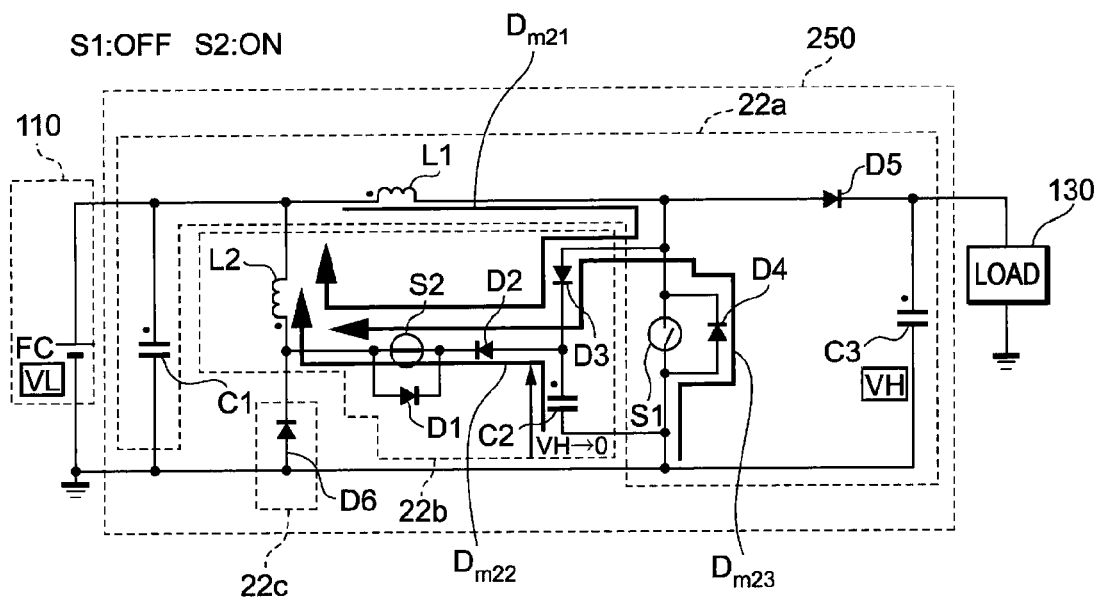
FIG. 6 is diagram showing an operation of mode 2.

Ip; phase current
L2id; the inductance of the auxiliary coil L2
(Mode 2; see FIG. 6)

When the transition completing time elapses to shift to the step S102, the current flowing through the diode D5 becomes zero, and the current flows into the auxiliary circuit 12b side through the coil L1 and the diode D5 (see an arrow Dm21 shown in FIG. 6). Instead, a charge in the snubber capacitor C2 flows into the auxiliary circuit 12b side owing to a potential difference between the voltage of the snubber capacitor C2 and the voltage VL of the fuel cell 110 (see an arrow Dm22 shown in FIG. 6). A voltage to be applied to the first switching element S1 is determined in accordance with a capacity of the snubber capacitor C2.

Figure 12:
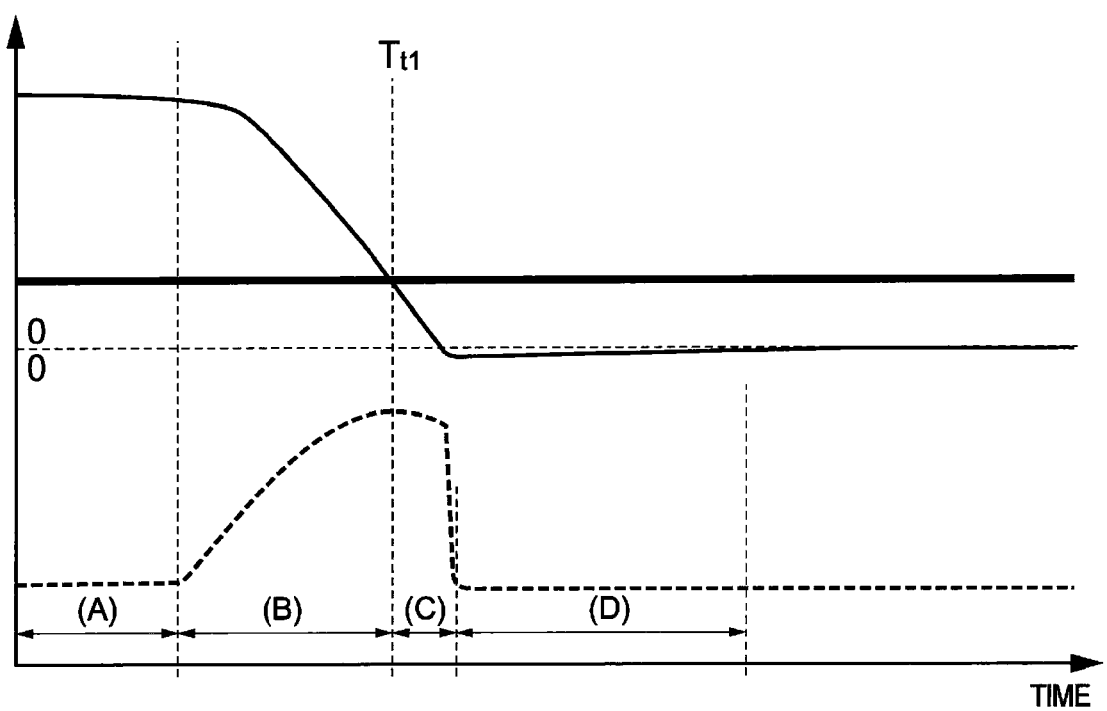
FIG. 12 is a diagram showing a voltage/current behavior in a transition process from the mode 2 to the mode 3.

Here, FIG. 12 is a diagram showing a voltage/current behavior in a transition process from the mode 2 to the mode 3. The voltage of the fuel cell 110 is shown by a bold solid line, the voltage of the snubber capacitor C2 is shown by a fine solid line, and the current of the snubber capacitor C2 is shown by a broken line.

After starting the energization of the path Dm21 shown in FIG. 6 (see (A) shown in FIG. 12), the energization of a path Dm22 shown in FIG. 6, i.e., the energization of the auxiliary coil L2 is started owing to the potential difference between the voltage VH of the snubber capacitor C2 and the voltage VL of the fuel cell 110 (see (B) shown in FIG. 12). Here, as shown in FIG. 12, the current of the snubber capacitor C2 continues to rise until the voltage of the snubber capacitor C2 reaches the voltage VL of the fuel cell 110.

Description will be made in detail. The charge accumulated in the snubber capacitor C2 starts to be regenerated on a power source side owing to the potential difference between the voltage VH of the snubber capacitor C2 and the voltage VL of the fuel cell 110 (the arrow Dm22 shown in FIG. 6).

However, the original potential difference is (VH−VL), and hence the flow of the charge accumulated in the snubber capacitor C2 (discharge) stops when a power source voltage (i.e. the voltage VL of the fuel cell 110) is reached (timing Tt1 shown in FIG. 12). However, owing to characteristics of the auxiliary coil L2 (i.e. characteristics that the current continues to be passed), the charge continues to be passed even when the voltage of the snubber capacitor C2 becomes VL or less (see (C) shown in FIG. 12). At this time, when the following formula (4)' is established, all the charge of the snubber capacitor C2 flows (is discharged).

$$\frac{1}{2}L*I^2 > \frac{1}{2}C*V^2, \quad (4)$$

Left side; energy accumulated in the auxiliary coil L2
Right side; energy remaining in the snubber capacitor C2

When the charge accumulated in the snubber capacitor C2 is removed, a free wheel operation is performed through a path Dm23 shown in FIG. 6, to continue the energization (see (D) shown in FIG. 12). In consequence, all the energy accumulated in the auxiliary coil L2 is released. It is to be noted that the anode of the diode D2 is connected to one end of the auxiliary coil L2, and hence LC resonance stops with a half wave. In consequence, the snubber capacitor C2 holds 0 V after the discharge.

Here, a transition completing time tmode2 from the mode 2 to the mode 3 is represented by the following equation (5).

$$t\,mod\,e2 = t\,mod\,e2' \quad (5)$$

$$t\,mod\,e2' = \pi\sqrt{L2id*C2d} \quad (5)'$$

Figure 7:
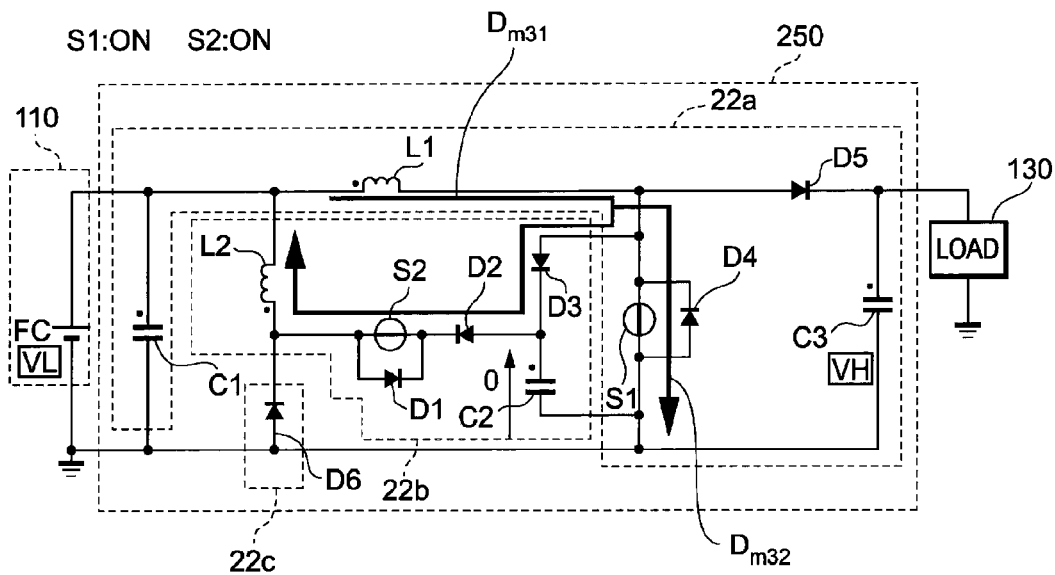
FIG. 7 is diagram showing an operation of mode 3.

C2d; capacity of the capacitor C2
(Mode 3; see FIG. 7)

An operation in which the current flows through the path Dm22 shown in FIG. 6 ends, and the charge of the snubber capacitor C2 is completely removed or becomes a minimum voltage (MIN voltage). In this case, the first switching element S1 is turned on, thereby shifting to the step S103. In a state where the voltage of the snubber capacitor C2 is zero, the voltage applied to the first switching element S1 becomes zero, and hence zero voltage switching (ZVS) is realized. In such a state, a current Il1 flowing through the coil L1 becomes a sum of a current Idm31 flowing on an auxiliary circuit 12b side as shown by an arrow Dm31 and a current Idm32 flowing through the first switching element S1 as shown by an arrow Dm32 (see the following equation (6)).

$$Il1 = Idm31 + Idm32 \quad (6)$$

Here, the current Idm31 flowing through the first switching element S1 is determined in accordance with a decreasing speed of the current Idm31 flowing on the auxiliary circuit 12b side. A current change speed of the current Idm31 flowing on the auxiliary circuit 12b side is represented by the following equation (7). That is, the current Idm31 flowing on the auxiliary circuit 12b side decreases with the change speed of the following equation (7). Therefore, even when the first switching element S1 is turned on, the current flowing through the first switching element S1 does not immediately rise, to realize zero current switching (ZCS).

$$\frac{di}{dt} = \frac{-VL}{L2} \quad (7)$$

Figure 8:
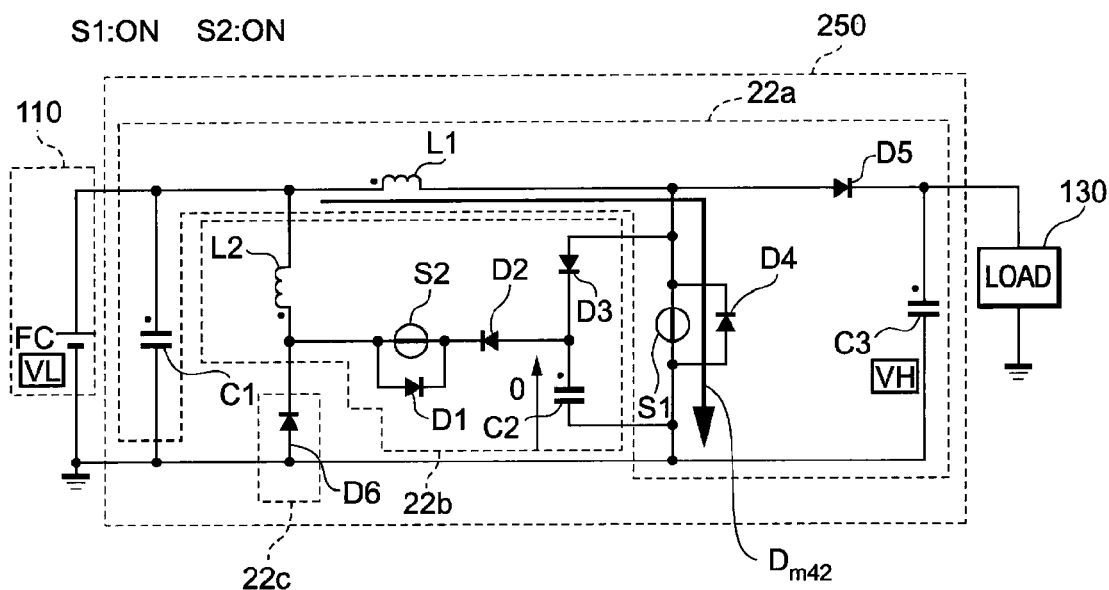
FIG. 8 is diagram showing an operation of mode 4.

(Mode 4; see FIG. 8)

Then, when the state of the step S103 continues in the step S104, an amount of the current flowing into the coil L1 is increased to gradually increase the energy accumulated in the coil L1 (see an arrow Dm42 in FIG. 8). Here, the diode D2 is present in the auxiliary circuit 12b. Therefore, any reverse current does not flow through the auxiliary coil L2, and the snubber capacitor C2 is not charged through the second switching element S2. Moreover, at this time, the first switching element S1 turns on, and hence the snubber capacitor C2 is not charged through the diode D3. In consequence, the current of the coil L1=the current of the first switching element S1, and the energy accumulated in the coil L1 gradually increases. Here, a turn-on time Ts1 of the first switching element S1 is approximately represented by the following equation (8).

$$Ts1 = (1 - VL/VH)*Tcon \quad (8)$$

Tcon; a control period

It is to be noted that the control period means a time period of the soft switching processing when a series of processing of the step S101 to the step S106 is regarded as one period (the one cycle).

Figure 9:
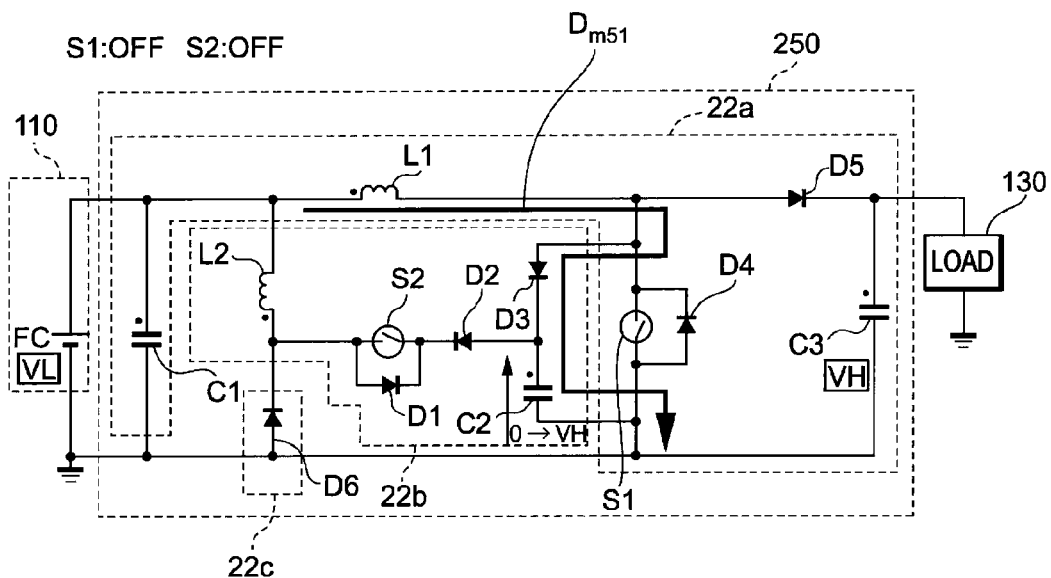
FIG. 9 is diagram showing an operation of mode 5.

(Mode 5; see FIG. 9)

Figure 11:
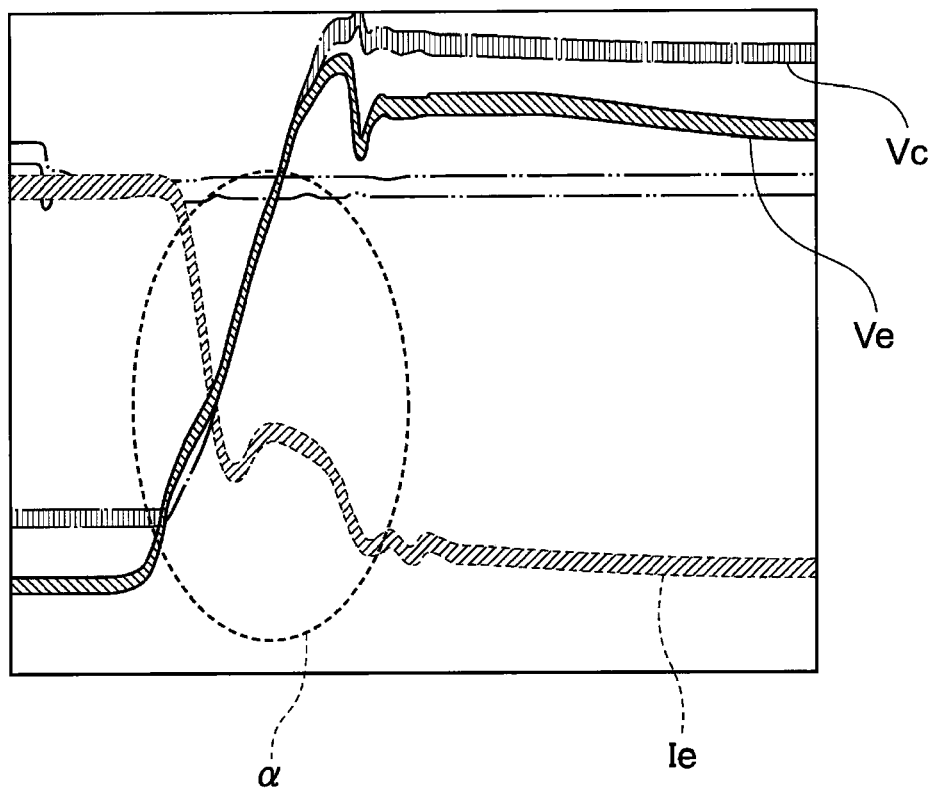
FIG. 11 is a diagram illustrating a relation among a voltage Vc of a snubber capacitor C2, a voltage Ve to be applied to a first switching element S1 and a current Ie flowing through the first switching element S1 in the mode 5.

When desirable energy is accumulated in the coil L1 in the step S104, the first switching element S12 is turned off, and the current flows through a path shown by an arrow Dm51 in FIG. 9. Here, FIG. 11 is a diagram illustrating a relation among the voltage Vc of the snubber capacitor C2, a voltage Ve to be applied to the first switching element S1 and a current Ie flowing through the first switching element S1 in the mode 5. When the above switching operation is performed, the snubber capacitor C2 in which the charge is removed to have a low voltage state in the mode 2 is charged. In consequence, the voltage Vc of the snubber capacitor C2 rises toward the converter output voltage VH of the FC soft switching converter 150. At this time, a rising speed of the voltage Ve applied to the first switching element S1 is suppressed by charging the snubber capacitor C2 (i.e. the rising of the voltage is dulled). It becomes possible to perform a ZVS operation which decreases switching loss at a turn-off time (see α shown in FIG. 11).

Figure 10:
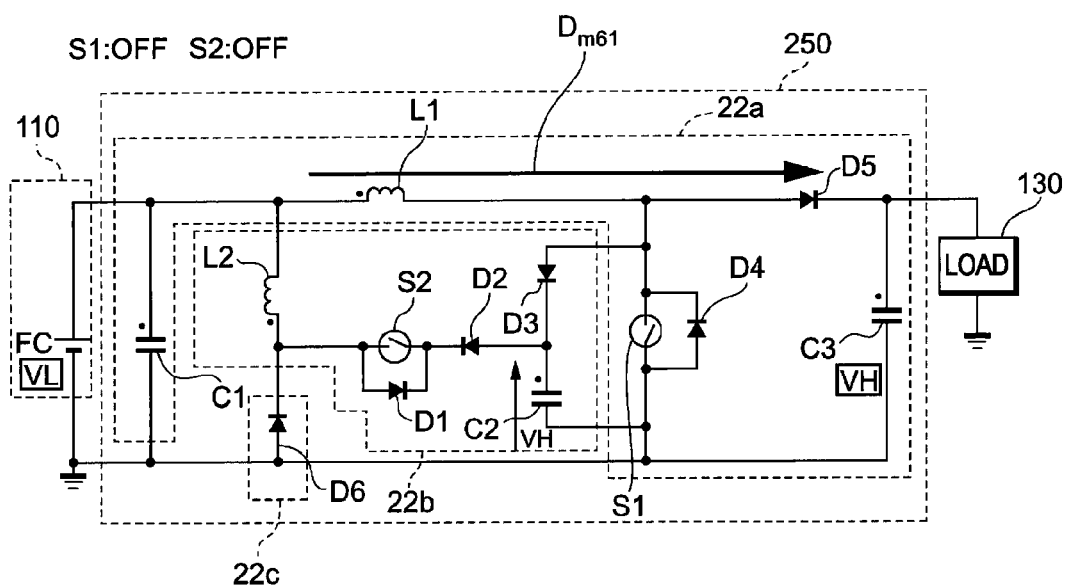
FIG. 10 is a diagram showing an operation of mode 6.

(Mode 6; see FIG. 10)

When the snubber capacitor C2 is charged to the voltage VH, the energy accumulated in the coil L1 is released to the load 130 side (see an arrow Dm61 shown in FIG. 10). Here, a turn-off time Ts2 of the first switching element S1 is approximately represented by the following equation (9).

$$Ts2 = (VL/VH)*Tcon \quad (9)$$

When the above-mentioned soft switching processing is performed, the switching loss of the FC soft switching converter 150 is suppressed as much as possible. In addition, the output voltage of the fuel cell 110 rises to a desirable voltage, and the voltage can be supplied to the load 130.

<Failure Determination of Auxiliary Circuit 22b>

Figure 13:
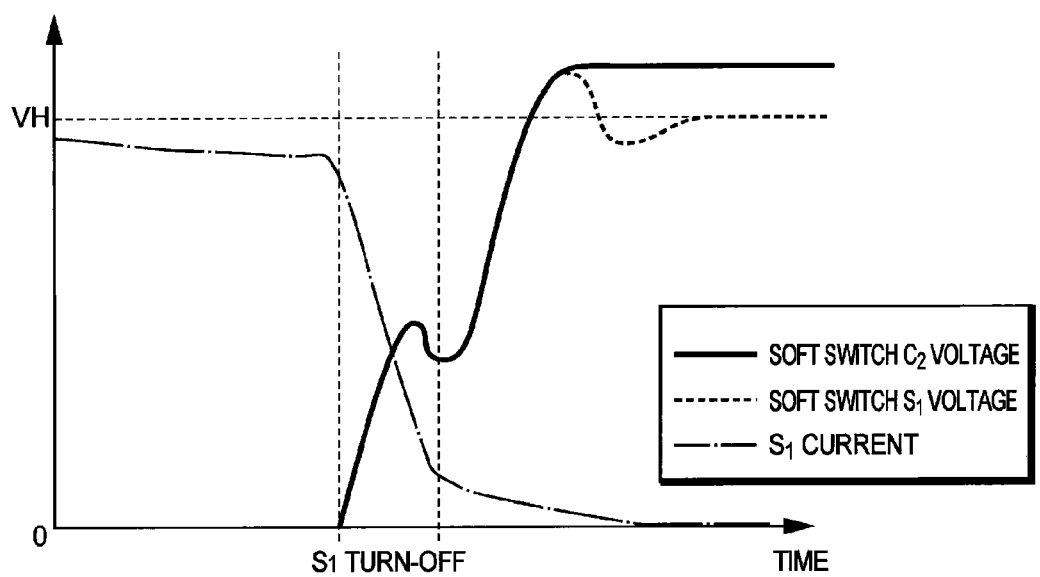
FIG. 13 is a diagram showing a voltage between both the ends of a snubber capacitor, a voltage between both the ends of a first switching element, and a current flowing through the first switching element in a case where an auxiliary circuit is normal.
Figure 14:
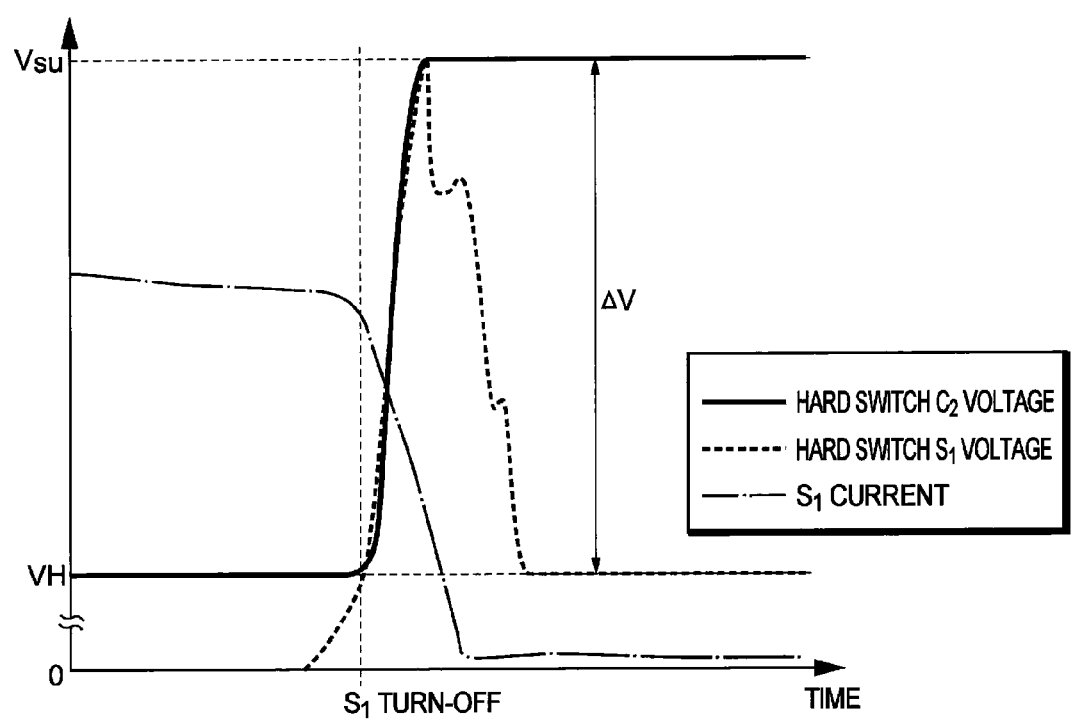
FIG. 14 is a diagram showing a voltage between both the ends of a snubber capacitor, a voltage between both the ends of a first switching element, and a current flowing through the first switching element in a case where the auxiliary circuit has an open failure.

Here, FIG. 13 is a diagram showing the voltage (a solid line) between both the ends of the snubber capacitor C2, the voltage (a broken line) between both the ends of the first switching element S1, and the current (a one-dot chain line) flowing through the first switching element S1 in a case where the auxiliary circuit 22b of the FC soft switching converter 150 is normal. FIG. 14 is a diagram showing the voltage (a solid line) between both the ends of the snubber capacitor C2, the voltage (a broken line) between both the ends of the first switching element S1, and the current (a one-dot chain line)

flowing through the first switching element S1 in a case where the open failure occurs in the auxiliary circuit 22b of the FC soft switching converter 150.

It is to be noted that in the following description, for the convenience of the description, a voltage Vc2 between both the ends of the snubber capacitor C2 and a voltage Vs1 between both the ends of the first switching element S1 in the case where the auxiliary circuit 22b is normal will be called the soft switch C2 voltage and the soft switch S1 voltage, respectively. The voltage Vc2 between both the ends of the snubber capacitor C2 and the voltage Vs1 between both the ends of the first switching element S1 in the case where the auxiliary circuit 22b has the open failure will be called the hard switch C2 voltage and the hard switch S1 voltage, respectively.

a. Case Where the Auxiliary Circuit 22b is Normal (see FIG. 13)

When the switching element turns off in the state where the auxiliary circuit 22b is normal (see Mode 4 shown in FIG. 8→Mode 5 shown in FIG. 9), the energy accumulated in the coil L1 is released, and the current flows through a path shown by an arrow Dm51 in FIG. 9. In consequence, the snubber capacitor C2 in which the charge is removed to have a low voltage state in the mode 2 is charged, and the soft switch C2 voltage rises. Here, the soft switch S1 voltage is clamped by the clamp diode D3, and the soft switch C2 voltage converges to the soft switch S1 voltage, i.e., the voltage VH.

b. Case Where the Open Failure Occurs in the Auxiliary Circuit 22b (see FIG. 14)

When the open failure occurs in the auxiliary circuit 22b, the voltage Vc2 between both the ends of the snubber capacitor C2 holds VH, before turning off the switching element. Here, when the first switching element S1 is turned off, the auxiliary circuit 22b does not normally operate. Therefore, the surge voltage Vsu is generated in the first switching element S1. The surge voltage Vsu is clamped by the clamp diode D3, and appears as the hard switch C2 voltage by the snubber capacitor C2. The hard switch S1 voltage finally converges to VH, but the hard switch C2 voltage is clamped by the surge voltage Vsu. Therefore, in the present embodiment, a difference voltage ΔV between the voltage Vc2 between both the ends of the snubber capacitor C2 and the voltage Vs1 between both the ends of the first switching element S1 is obtained. When the obtained difference voltage ΔV is not less than a difference voltage threshold value, it is judged that the failure (the open failure) occurs in the auxiliary circuit 22b. Needless to say, the difference voltage ΔV is not obtained, but the voltage Vc2 between both the ends of the snubber capacitor C2 is only detected. When the detected voltage Vc2 between both the ends of the capacitor C2 is not less than a normal voltage threshold value, it may be judged that the failure (the open failure) occurs (for details, see Modification Example 1). It is to be noted that the difference voltage threshold value and the normal voltage threshold value may beforehand be obtained by experiments, and the like. Hereinafter, failure determination processing of the auxiliary circuit 22b will be described with reference to FIG. 15.

Figure 15:
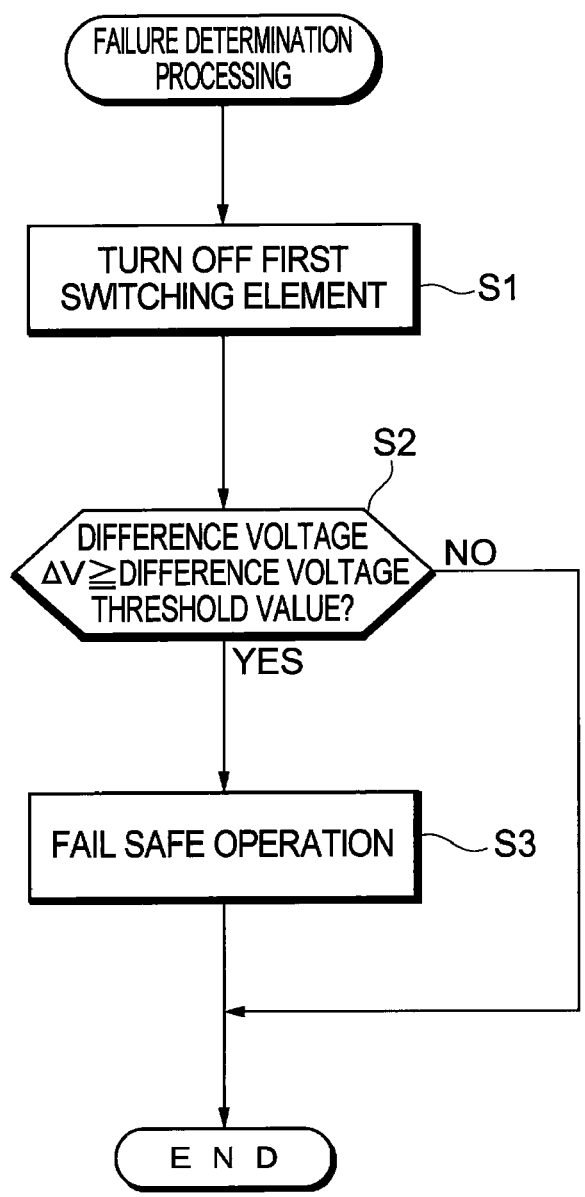
FIG. 15 is a flowchart showing failure determination processing of the auxiliary circuit.

FIG. 15 is a flowchart showing the failure determination processing of the auxiliary circuit 22b executed by the controller 160.

On turning off the first switching element S1, for example, with the transition from the mode 4 shown in FIG. 8 to the mode 5 shown in FIG. 9 (step S1), the controller (difference deriving means) 160 detects the voltage Vc2 between both the ends of the snubber capacitor C2 and the voltage Vs1 between both the ends of the first switching element S1, to obtain the difference voltage ΔV.

The controller 160 compares the obtained difference voltage ΔV with a voltage threshold value stored in a memory (not shown), to judge whether or not the difference voltage ΔV is larger than the difference voltage threshold value (step S2).

When the difference voltage ΔV is smaller than the difference voltage threshold value, the controller 160 judges that the auxiliary circuit 22b is normal, to end the processing.

On the other hand, when the difference voltage ΔV is not less than the difference voltage threshold value, the controller (judging means and fail safe means) 160 judges that the failure (the open failure) occurs in the auxiliary circuit 22b, to shift to the fail safe operation shown in step S3, thereby ending the processing. Here, as the fail safe operation, the converter of a phase (e.g. the U-phase) in which it is judged that the open failure occurs in the auxiliary circuit 22b is stopped, and the load 130 is driven by utilizing the converter of the remaining phase (e.g. the V-phase or the W-phase).

As well known, when a large surge voltage Vsu is generated in the switching element S1 (see FIG. 15), large energy loss is generated in the switching element S1. In the worst case, a problem that element breakdown is incurred by abnormal overheat or the like occurs. Therefore, in the present embodiment, the operation of the converter of the phase in which it is judged that the open failure occurs in the auxiliary circuit 22b as described above is stopped, whereby it is possible to prevent a problem such as the element breakdown in advance.

B. Modification Examples

Modification Example 1

Figure 16:
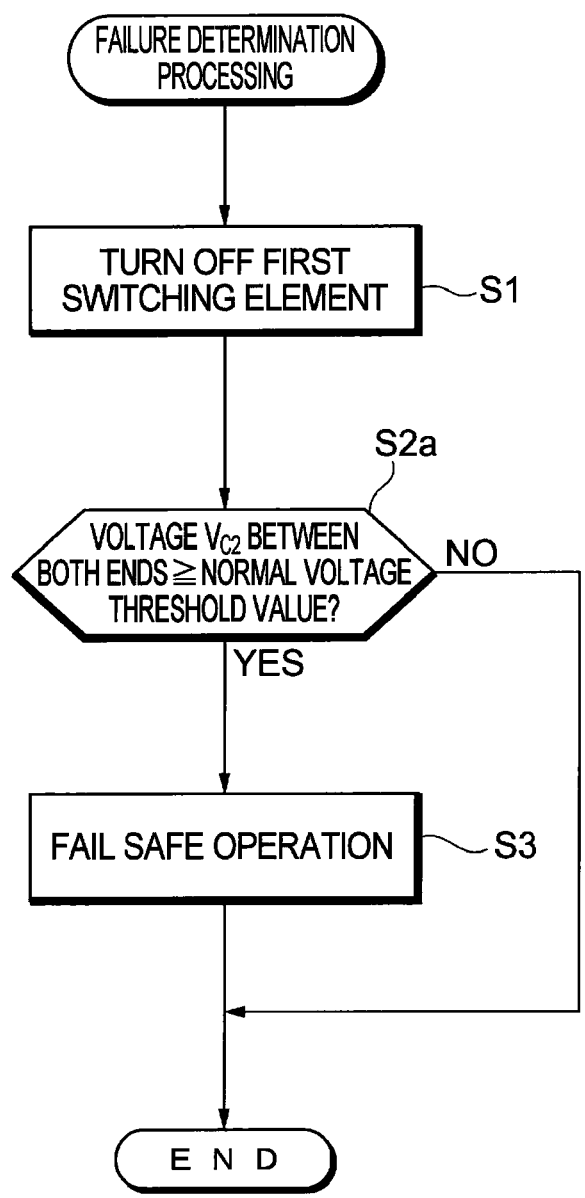
FIG. 16 is a flowchart showing failure determination processing of an auxiliary circuit according to a modification example.

FIG. 16 is a flowchart showing failure determination processing of an auxiliary circuit 22b according to Modification Example 1. It is to be noted that as to steps shown in FIG. 16, the steps corresponding to those of FIG. 15 are denoted with the same marks, and detailed description is omitted.

On turning off a first switching element S1 (step S1), a controller (difference deriving means) 160 detects a voltage Vc2 between both the ends of a snubber capacitor C2.

The controller 160 compares the detected voltage Vc2 between both the ends of the snubber capacitor C2 with a normal voltage threshold value stored in a memory (not shown), to judge whether or not the voltage Vc2 between both the ends of the snubber capacitor C2 is larger than the normal voltage threshold value (step Sa2).

When the voltage Vc2 between both the ends of the snubber capacitor C2 is smaller than the normal voltage threshold value, the controller 160 judges that the auxiliary circuit 22b is normal, to end the processing.

On the other hand, when the voltage Vc2 between both the ends of the snubber capacitor C2 is not less than the normal voltage threshold value, the controller (judging means and fail safe means) 160 judges that a failure (an open failure) occurs in the auxiliary circuit 22b, to shift to a fail safe operation shown in step S3, thereby ending the processing. Here, as the fail safe operation, a converter of a phase (e.g. a U-phase) in which it is judged that the open failure occurs in the auxiliary circuit 22b is stopped, and a load 130 is driven by utilizing a converter of a remaining phase (e.g. a V-phase or a W-phase).

Modification Example 2

In the above-mentioned present embodiment, there has been described, as the fail safe operation, a case where the converter of the phase in which it is judged that the open failure occurs is stopped, and the load 130 is driven by utilizing the converter of the remaining phase, but the present invention is not limited to this embodiment. For example, as to the phase in which it is judged that the open failure occurs, soft switching is not performed, but hard switching may be performed. However, when the hard switching is performed, a problem such as element breakdown might occur in the first switching element S1. Therefore, an output may be limited so as to beforehand suppress a rate of change of a current. Specifically, the controller (the fail safe means) 160 performs monitoring/limiting so that the rate of change of the current flowing through the first switching element S1 is not more than a preset threshold change rate. Specifically, when the hard switching is performed, a gate resistance of the first switching element S1 may be increased, or a maximum permissible value of the load 130 may be set to a low value, to limit the output. Here, as the gate resistance of the first switching element S1, there are prepared a gate resistance (hereinafter referred to as the first gate resistance) R1 to be utilized, for example, in a case where the auxiliary circuit 22b is normal, and a large gate resistance (hereinafter referred to as the second gate resistance) R2 (>R1) for use in a case where the open failure occurs in the auxiliary circuit 22b. The controller 160 performs the selection switching of the gate resistance of the first switching element S1 on the basis of the execution result of the failure determination processing shown in FIG. 15 or FIG. 16. That is, on judging that the auxiliary circuit 22b is normal (the step S2 or S2a; NO), the controller 160 selects the first gate resistance R1, whereas on judging that the open failure occurs in the auxiliary circuit 22b (the step S2 or S2a; YES), the controller selects the second gate resistance R2. According to such a constitution, a problem such as element breakdown may be prevented in advance. It is to be noted that an operation in a case where the selection switching of the maximum permissible value of the load 130 can be described in the same manner as in the case where the selection switching of the gate resistance of the first switching element S1 is performed, and hence the description thereof is omitted. Moreover, the gate resistance value of the first switching element S1 or the maximum permissible value of the load 130 may beforehand be obtained by experiments or the like.

Moreover, as a cause for the difference voltage ΔV which becomes the voltage threshold value or more, it is considered that the charge of the snubber capacitor C2 is not sufficiently removed, before turning off the switching element. In this case, the on/off timing of the second switching element S of the auxiliary circuit 22b may appropriately be changed, to confirm whether the charge of the snubber capacitor C2 is sufficiently removed. Additionally, the difference voltage ΔV may be obtained again to judge whether or not the open failure occurs in the auxiliary circuit 22b.

Modification Example 3

Figure 17:
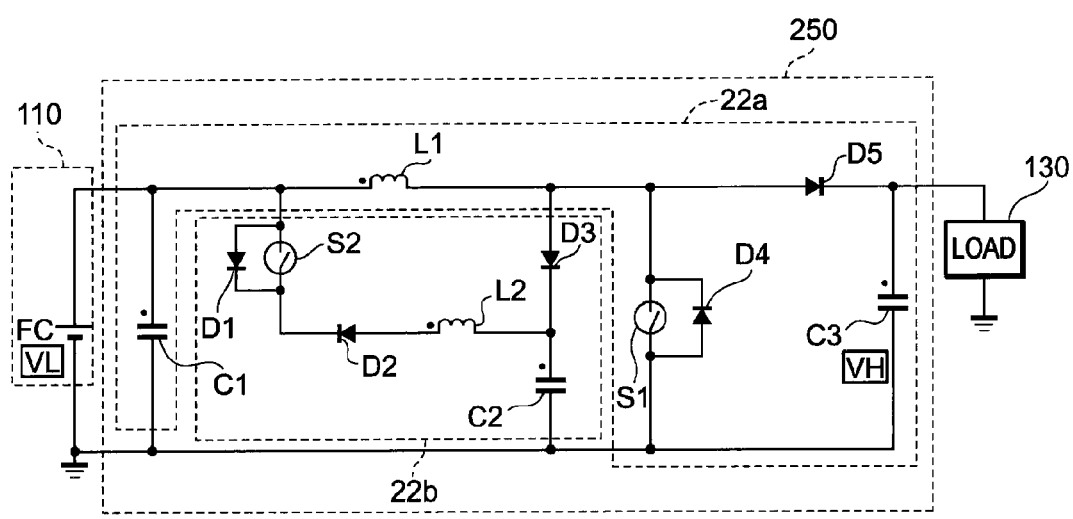
FIG. 17 is a diagram illustrating another constitution of the auxiliary circuit.
Figure 18:
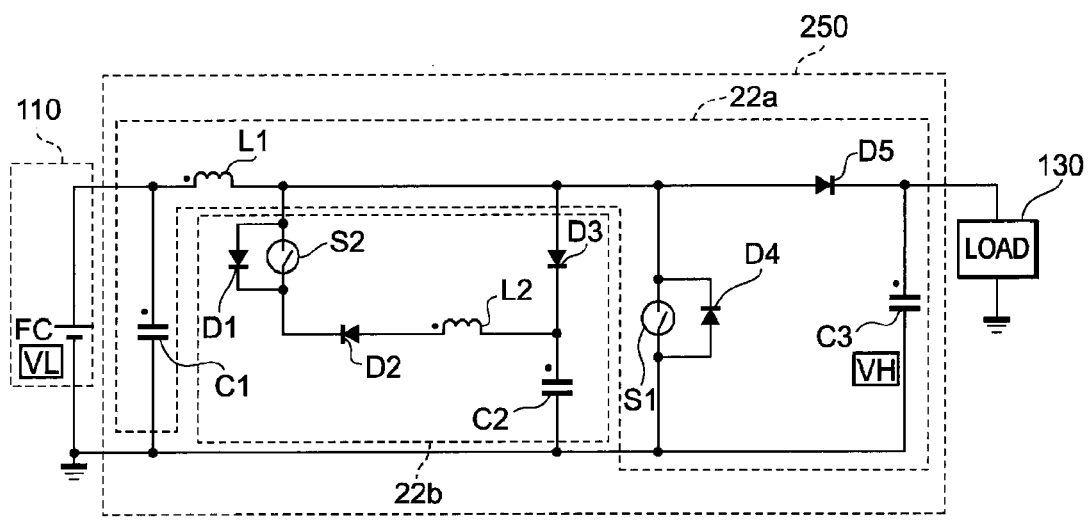
FIG. 18 is a diagram illuminating still another constitution of the auxiliary circuit.

Moreover, in the above-mentioned present embodiment, as the second series connecting member included in the auxiliary circuit 22b, there has been described an example where the anode terminal of the diode D2 is connected to the connecting portion between the diode D3 and the snubber capacitor C2 of the first series connecting member, and the cathode terminal of the diode D2 is connected to the pole of one end of the second switching element (the auxiliary switch) S2 (see FIG. 3). However, as a circuit topology of this second series connecting member, there can be employed a configuration in which the series order of the switching circuit including the coil L2, the diode D2, the second switching element S2 and the like is appropriately replaced. Specifically, as shown in FIG. 16 or FIG. 17, the free wheel circuit 22c may be omitted, and the order of the switching circuit including the coil L2, the second switching element S2 and the like may be replaced.

DESCRIPTION OF REFERENCE NUMERALS

100 . . . FCHV system, 110 . . . fuel cell, 120 . . . battery, 130 . . . load, 140 . . . inverter, 2500 . . . FC converter, 160 . . . controller, 170 . . . sensor group, 180 . . . battery converter, 250 . . . FC soft switching converter, 22a . . . main voltage raising circuit, 22b . . . auxiliary circuit, 22c . . . free wheel circuit, S1 and S2 . . . switching element, C1 and C3 . . . smoothing capacitor, C2 . . . snubber capacitor, L1 and L2 . . . coil, D1, D2, D3, D4 and D5 . . . diode, and D6 . . . free wheel diode.

The invention claimed is:

1. A controller of a soft switching converter which controls an output voltage of a fuel cell and which includes a main voltage raising circuit and an auxiliary circuit,
the auxiliary circuit including:
an auxiliary switch, and
a first series connecting member in which a clamp diode and a snubber capacitor are connected in series, the clamp diode and the snubber capacitor being connected in parallel with a main switch constituting the main voltage raising circuit and connected to a high potential side terminal and a low potential side terminal of the fuel cell;
the converter controller comprising:
a detecting device that detects a voltage between both the ends of the snubber capacitor clamped by the clamp diode in a case where the main switch is turned off, and
a judging device that compares the voltage between both the ends of the snubber capacitor with a set normal voltage threshold value to judge that an abnormality occurs in the auxiliary circuit in a case where the voltage between both ends exceeds the normal voltage threshold value,
wherein, when the judging device judges that an abnormality has occurred in the auxiliary circuit, the judging device switches from a first phase of the converter, in which the auxiliary circuit has the abnormality, to a second phase of the converter.

2. The converter controller according to claim 1, further comprising a difference deriving device that obtains a difference voltage between the voltage between both the ends of the snubber capacitor and a voltage between both the ends of the main switch,
wherein the judging device compares the difference voltage with a set failure determination threshold value to judge that the abnormality occurs in the auxiliary circuit in a case where the difference voltage exceeds the failure determination threshold value.

3. The converter controller according to claim 1, further comprising a failsafe device that stops an operation of the main voltage raising circuit in a case where it is judged that the abnormality occurs in the auxiliary circuit.

4. The converter controller according to claim 1, further comprising a failsafe device that limits a rate of change of a current which flows through the main switch of the main voltage raising circuit to a threshold rate of change or less in a case where it is judged that the abnormality occurs in the auxiliary circuit.

5. The converter controller according to claim 1, wherein the auxiliary circuit further includes a second series connecting member in which a diode, an auxiliary coil and the auxiliary switch are connected in series, the diode, the auxiliary coil and the auxiliary switch being connected to a portion between a connecting portion of the clamp diode and the snubber capacitor and one end of the a main coil.

6. The converter controller according to claim 1, wherein the main voltage raising circuit further includes:
   a main coil whose one end is connected to the high potential side terminal of the fuel cell,
   a first diode whose anode is connected to the other end of the main coil, and
   a smoothing capacitor connected to an cathode of the first diode and the low potential side terminal of the fuel cell, and
   one end of the main switch is connected to the other end of the main coil and the other end thereof is connected to the low potential side terminal of the fuel cell.

7. The converter controller according to claim 1, wherein the soft switching converter is a multiphase soft switching converter comprising the auxiliary circuit every phase, and
   auxiliary coils constituting the auxiliary circuits of the respective phases are common to the auxiliary circuits of all the phases.

8. The converter controller according to claim 4, wherein the failsafe device sets a gate resistance in the case where it is judged that the abnormality occurs in the auxiliary circuit to a value which is larger than a gate resistance of the main switch in a case where it is judged that the auxiliary circuit is normal, to limit the rate of change of the current to the threshold rate of change or less.

* * * * *